Figure 2:
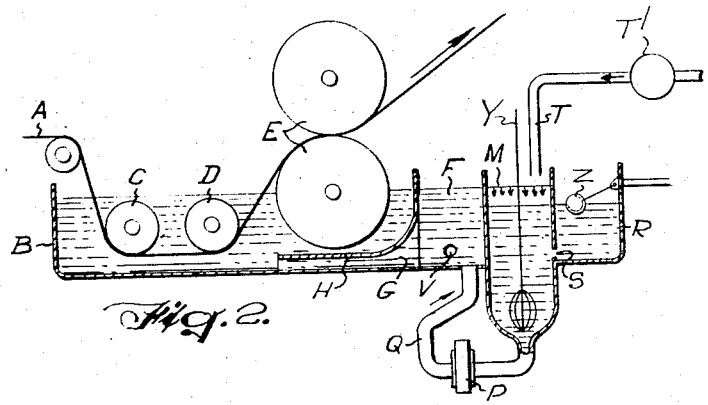

Dec. 20, 1966 E. H. JONES 3,292,573
METHOD AND MEANS FOR THE AUTOMATIC REGULATION OF THE CONTINUOUS
APPLICATION OF SPECIFIED AMOUNTS OF SOLIDS OR LIQUIDS
TO A MOVING SHEET OF MATERIAL
Filed Feb. 19, 1964

INVENTOR:
ERIC H. JONES
BY:
Frederick Breitenfeld
ATTORNEY

United States Patent Office 3,292,573
Patented Dec. 20, 1966

3,292,573
METHOD AND MEANS FOR THE AUTOMATIC REGULATION OF THE CONTINUOUS APPLICATION OF SPECIFIED AMOUNTS OF SOLIDS OR LIQUIDS TO A MOVING SHEET OF MATERIAL
Eric Harding Jones, Bramhall, England, assignor to The Cotton Silk and Man-Made Fibres Research Association, Northern Ireland and the Isle of Man, an association of Great Britain
Filed Feb. 19, 1964, Ser. No. 345,938
Claims priority, application Great Britain, Feb. 20, 1963, 6,907/63
13 Claims. (Cl. 118—7)

This invention concerns a method and means for the automatic regulation of the continuous application of specified amounts of solids or liquids to a moving sheet of material.

In my prior Patent No. 2,583,267 I have described a method (and apparatus for carrying it out) of applying to a continuously moving sheet of material a prescribed weight per unit length of a substance wherein such substance is supplied to a reservoir and from which reservoir it is applied as a neat fluid or in solution or dispersion in a fluid medium to the said moving sheet of material which is characterised in that the substance is supplied to the said reservoir at a rate predetermined by the speed of movement of the sheet of material and the said prescribed weight of substance per unit length to be applied thereto, and in that any change in weight of fluid in the reservoir which results from a deviation of actual rate of application of the substance from the prescribed rate of application, is utilized to alter some property of the fluid in the reservoir so as to correct the said deviation.

In practising such a method (when the altered property of the fluid is the degree of dilution by a diluent) it is usually of some importance to ensure that, whilst maintaining a sensibly constant volume of liquor in the reservoir and its associated equipment by adding diluent, the diluent so added becomes intimately mixed both with the ingredients fed to the system and with the liquor already in the working section of the reservoir itself. The principal object of the present invention is to provide apparatus whereby this desirable result is achieved.

According to the present invention apparatus for the continuous application of specified amounts of a substance to a moving sheet of material comprising in combination a main container for liquid, means for continuously progressing sheet material therethrough, a mixing trough in free communication with said main container, a smaller container for liquid, means for continuously and positively circulating liquid around the system which comprises said mixing trough and said smaller container at a rate greater than the rate of take-up of liquid by the material, flow control means in said system whereby changes in the rate of take-up of liquid from said main container by the material are reflected in changes in the amount of liquid in the smaller container, means for continuously supplying liquor containing or consisting of said substance to said smaller container at a rate corresponding with the specified rate of take-up of said substance by the material, and means for supplying diluent to said smaller container at a rate so dependent on the amount of liquid therein that the diluent feed is varied to maintain a substantially constant total amount of liquid in the apparatus. The mixing trough is preferably in communication at its ends with the side regions of the main container, and the circulating liquid is fed to the central region of the mixing trough.

The smaller container may conveniently be in two sections, the first, deeper, section of which is supplied with said liquor, and the second, shallower, section of which is separated therefrom by a partition having a slot at the bottom thereof and is supplied with diluent. The first section may receive the circulating liquid via an adjustable weir which constitutes said flow control means. A mixer is usually disposed in the first section and is capable of creating a vortex in the liquid contained therein. A suitable means for supplying diluent to the second section comprises a ball valve sensitive to the level of liquid therein.

The cross-sectional area of the main container is preferably at least ten times greater than that of the smaller container.

Agitating means are normally provided, extending from the ends of the mixing trough towards its central region, and, in order that heating of the liquid in this trough may additionally be achieved, these means may be steam inlet pipes.

It is usually convenient for the central region of the mixing trough to be connected to the smaller container by a further trough, and in order that operating conditions in the main container should not affect the operation of the apparatus undesirably the communication between the mixing trough and the main container may be by way of conduits extending to selected regions where the fluid pressure is least affected by operating conditions in the main container.

Figure 1:
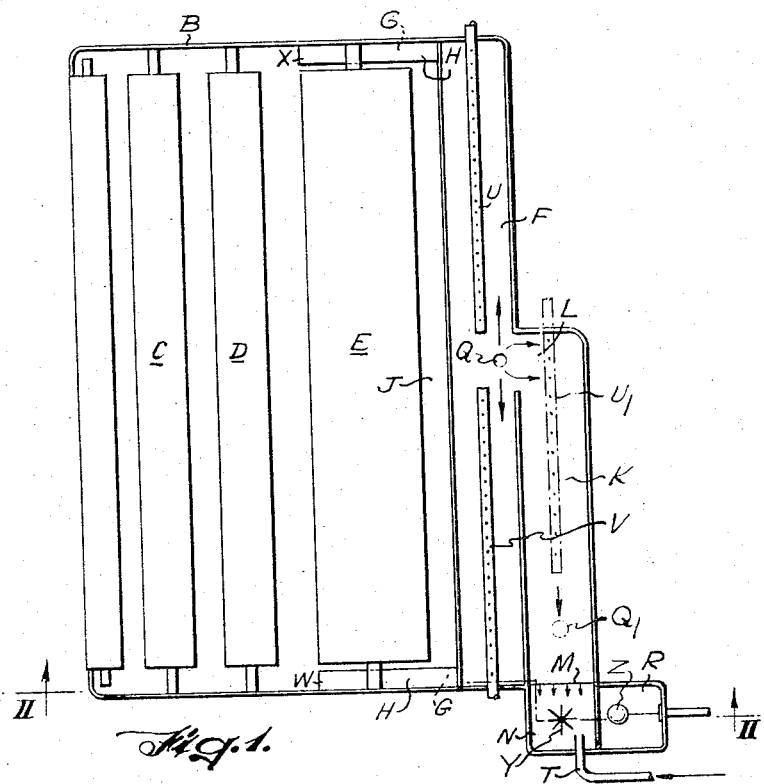

The invention will now be described further, by way of example, with reference to the accompanying drawings, in which:

FIG. 1 is a plan view of a size box used in the sizing of warp yarns and constructed according to the invention, and FIG. 2 is a section on the lines II—II of FIG. 1, and showing also the run of the warp.

In this apparatus (see FIG. 1) a warp sheet A passes into the main container, reservoir, or workinig section B of the size box by way of a pair of immersion rollers C and D. The warp A, laden with size, emerges from the bath and passes through a pair of squeezing rollers E which squeeze excess size off the warp.

In accordance with the principle of the invention disclosed in the specification of our prior patent aforesaid the application of a controlled amount of sizing substance per given weight of warp is obtained by feeding the substance to the size box, at the required rate of application, in the form of a stock size or slurry of higher concentration than is required in the working section of the box, and running diluent in to maintain a substantially constant volume of liquor in the box.

In order to accomplish this in accordance with the present invention, a long narrow mixing trough F is provided at the front of the working section B. The trough lies along the full width of the working section B and communicates with that working section through two ports G and H formed at the ends of the submerged portion of a partition J separating the working section B from the trough F. An additional narrow trough K mounted in front of the first trough, and having a length rather more than half the length of the first trough, communicates with the first trough by way of an opening L. One end of this trough is equipped with a weir M, of adjustable height, over which excess of liquor can flow into a narrow vertical mixing vessel N equipped with a rapidly rotating mixer, stirrer or whisk Y. A pump P circulates liquor continuously from the bottom of the mixing vessel N through a pipe Q which enters the bottom of trough F midway along its length. The rate of circulation of liquor is always greater than the maximum rate at which liquor is taken out of the bath by the moving warp. A small vessel R attached to one side of and near to the top of the mixing vessel N communicates with N through a narrow horizontal slot S, the bottom edge of which is several inches below the level of the weir M. The vessel R contains a small ball or float valve Z or similar device operating on a water supply to maintain an approximately constant level of water in vessel R, the level being normally above that of the top edge of the slot S but below the edge of the weir M. The concentrated liquor or slurry is fed into the mixing vessel N by way of a pipe T by means of a pump $T_1$ which is adjustable to enable the correct supply rate to be preset. The most convenient arrangement is to drive the pump from the main machine drive and to provide positively infinitely variable gear means for adjustment purposes. In this way the feed of liquor is correlated with the travel of the warp through the box. Perforated steam-pipes U and V are fitted to maintain the size in the trough F in a state of ebullition to ensure adequate homogeneity of concentration of the mixing in the trough before it passes as required into the working section of the box through the ports G and H. Steam-heating in F is also used to gelatinize the size when this is fed to the system as a cold slurry as described in our prior British patent specification No. 792,663 or from the output of a continuous slurry mixing unit to which dry ingredients are continuously weighed out as described in our prior specification No. 2,956,905. For size mixtures which have not to be boiled, the agitation necessary for producing homogenity in the trough F may be provided by suitable mechanical means instead of by steam injection. Steam or other means of agitation may also be provided in trough K.

If the size in the working section B is highly viscous, it may tend to assume different levels at different parts of B because of the agitation provided by the various rollers rotating in B. Under such conditions, unless special precautions are taken, the level in the trough F may tend to change as the speed of rotation of the rollers is changed. In order to minimise this effect, steps are taken to ensure that the pressure in the liquor at the ports G and H changes as little as possible with dynamic changes in level of the size in B. It is for this reason that the ports are extended back into the working section (as shown) by tubes or conduits W and X. These conduits terminate at appropriate regions determined experimentally in the working section B where the fluid pressure is least affected by different degrees of agitation of the liquor produced by different speeds of rotation of the rollers.

In operation the supply through pipe T is adjusted at a constant rate according to the rate of travel of the warp and the amount of size per unit length it is wished to deposit thereon. The height of the weir will be fixed at a convenient level, and, with the pump P operating and the ball valve controlling the rate of admission of diluent, the system will be in equilibrium with the take-up of size at the desired rate. If this rate increases or decreases this is rapidly reflected in a drop or rise in level in the mixing vessel N and water vessel R, and thus by an increase or decrease in diluent supply. This serves to correct the rate of take-up automatically as is explained fully in my prior Patent No. 2,583,267.

The more important features of the particular apparatus just described are:

(1) The combined horizontal cross-sectional areas of the water vessel R and the mixing vessel N are a small fraction $f$ of the combined cross-sectional areas of the vessels B and F (the fraction $f$ is preferably smaller than $\frac{1}{10}$). This ensures that any fluctuation $d$ in the depth of water in R is equivalent to a fluctuation of only $d \times f$ in a system of similar capacity but without a circulatory level controller. For example, in a preferred layout, the water vessel R and the mixing vessel N have a total cross-sectional area of 30 square inches which is only one-twentieth of the combined cross-sectional areas of section B and troughs F and K and therefore a fluctuation in depth of one inch in R corresponds to a fluctuation of only one-twentieth of an inch in the level in section B. In effect, this means that provision is made for very accurate control of volume in the system even when the fluctuations in depth of liquid in the control vessel are of such a magnitude as to allow control to be effected by such simple means as a ball valve.

(2) The ball valve Z operates in its own compartment R. This greatly reduces the possibility of the ball becoming fouled with size, since the flow of water is always from the water vessel R and there is little chance of size running back into the water vessel from the mixing vessel N. Furthermore the slot through which the water flows from vessel R to vessel N is made as narrow as possible in order to minimise the possibility of size diffusing through the slot from N into the vessel R. If necessary, arrangements can be made to employ the incoming water to spray the float of the ball valve Z, as an extra precaution against contamination of the ball with size.

(3) The various sections of the circulatory system and the positions of the inlets and outlets are designed with the following aims:

(a) The circulatory system should provide a steady and matched replacement of used size through the two ports G, H at opposite ends of the mixing trough F. To ensure this the trough F is made symmetrical and the size from the circulating pump P is delivered into the trough F midway along its length. In an alternative arrangement the pump P feeds into the trough K at some point $Q_1$ along its length, and this trough also has a steam inlet pipe $U_1$. This enables a longer boiling up time for the liquid to be maintained.

(b) The amount of fresh diluted size which has to be boiled up in the mixing trough F is decided entirely by, and is approximately equal to, the amount of size taken up by the warp A. This means it is always kept at a minimum. The aim is to ensure that there is little or no flow of size along the trough F from the midway point of entry Q unless this flow is induced by a fall in level in the working section B. The excess of size delivered midway along the trough F by the circulatory pump is returned to the mixing vessel over the weir M.

(c) The fresh size brought into the mixing trough F by the demand of size by the warp A travels steadily from the midway point of entry Q to the ports G, H at the two ends of the trough F. This ensures that each element of fresh size passing through the ports G, H has always received as long a boiling-up period as possible.

(d) As the rate of circulation of liquor is considerably in excess of the rate of usage, much of the size from the mixing vessel N is repeatedly recirculated and re-stirred before it passes along the mixing trough F. This assists in producing homogenity in dilution and in dispersion of the sizing ingredients.

(e) A high rate of stirring is maintained in the mixing vessel by means of the mixer, stirrer or whisk W which normally produces a vortex in the mixing vessel N. The concentrated stock size, slurry, tallow or other sizing ingredients are fed into the vortex which quickly disperses them throughout the liquor already in the mixing vessel N.

(f) If it should be that the mixing vessel N has to receive a stock liquor (e.g. a cold slurry) reaching it by way of an open channel, the use of an open mixing vessel rather than a closed line mixer into which the various liquids would have to be fed by forced flow is an advantage.

(g) The weir M into the mixing vessel N is adjustable in height so that the operator can set the level of size in the box to meet individual requirements.

(4) Means are provided where circumstances are appropriate, as already explained, to ensure that the pressure in the liquid at the ports, where the size enters the working section of the box, is affected as little as possible by the stirring action of the rollers in the working section of the box.

I claim:
1. Apparatus for the continuous application of specified amounts of a substance to a moving sheet of material comprising in combination a main container for liquid, means for continuously progressing sheet material therethrough, a mixing trough extending along one end of said container and in free communication only at its ends with the side regions of said main container, a smaller container for liquids, the cross-sectional area of said smaller container being a small fraction only of the cross-sectional area of said main container, means for continuously and positively circulating liquid around the system which comprises said mixing trough and said smaller container, at a rate greater than the rate of take-up of liquid by the material and so that an appropriate part of the circulating liquid is available for travel along said mixing trough from the central portion thereof to the ends thereof as required, flow control means in said system whereby changes in the rate of take-up of liquid from said main container by the material are reflected in changes in the amount of liquid in the smaller container, means for continuously supplying liquor containing or consisting of said substance to said smaller container at a rate corresponding with the specified rate of take-up of said substance by the material, and means for supplying diluent to said smaller container at a rate so dependent on the amount of liquid therein that the diluent feed is varied to maintain a substantially constant total amount of liquid in the apparatus.

2. Apparatus as set forth in claim 1, in which said circulating liquid is fed directly to the cental region of said mixing trough.

3. Apparatus as set forth in claim 1, in which there is provided a further trough connecting the central region of the mixing trough to said smaller container, and in which said circulating liquid is fed to a point along the length of said further trough.

4. Apparatus as claimed in claim 1 in which the smaller container is in two sections, the first, deeper, section of which is supplied with said liquor, and the second, shallower, section of which is separated therefrom by a partition having a slot at the bottom thereof and is supplied with diluent.

5. Apparatus as claimed in claim 4 in which said first section receives the circulating liquid via an adjustable weir which constitutes said flow control means.

6. Apparatus as claimed in claim 4 in which a mixer is disposed in said first section capable of creating a vortex in the liquid contained therein.

7. Apparatus as claimed in claim 4 in which the means for supplying diluent to said second section comprises a ball valve sensitive to the level of liquid therein.

8. Apparatus as claimed in claim 1 in which the cross-sectional area of the main container is at least ten times that of the smaller container.

9. Apparatus as claimed in claim 1 in which agitating means extend from the ends of the mixing trough towards its central region.

10. Apparatus as claimed in claim 9 in which said agitating means consist of steam inlet pipes, whereby the further function of heating up the liquid therein may be performed.

11. Apparatus as claimed in claim 3 in which said further trough has a steam inlet pipe extending therealong.

12. Apparatus as claimed in claim 1 in which communication between the mixing trough and the main container is by way of conduits extending to selected regions where the fluid pressure is least affected by operating conditions in the main container.

13. Apparatus as claimed in claim 1 in which the mixing trough is of unitary construction with the main container, being separated therefrom by a partition.

References Cited by the Examiner
UNITED STATES PATENTS

| | | | |
|---|---|---|---|
| 2,956,905 | 10/1960 | Jones et al. | 118—8 X |
| 2,981,638 | 4/1961 | Jones | 118—7 X |

CHARLES A. WILLMUTH, *Primary Examiner.*

L. G. MACHLIN, *Assistant Examiner.*